United States Patent
Eldada

(10) Patent No.: US 6,842,544 B2
(45) Date of Patent: Jan. 11, 2005

(54) METHOD FOR APODIZING A PLANAR WAVEGUIDE GRATING

(75) Inventor: Louay Eldada, Acton, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/952,201

(22) Filed: Sep. 14, 2001

(65) Prior Publication Data

US 2003/0053732 A1 Mar. 20, 2003

(51) Int. Cl.[7] ............................................. G02B 6/34
(52) U.S. Cl. ........................ 385/10; 385/37; 430/290
(58) Field of Search ........................... 385/10, 15, 37, 385/124, 130, 147, 129; 430/290

(56) References Cited

U.S. PATENT DOCUMENTS

| | | | |
|---|---|---|---|
| 5,309,260 A | | 5/1994 | Mizrahi et al. ............. 359/3 |
| 5,367,588 A | * | 11/1994 | Hill et al. .................. 385/37 |
| 5,495,548 A | * | 2/1996 | Bilodeau et al. ........... 385/123 |
| 5,717,799 A | | 2/1998 | Robinson ................... 385/37 |
| 5,912,999 A | | 6/1999 | Brennan, III et al. ........ 385/37 |
| 6,344,298 B1 | * | 2/2002 | Starodubov et al. ......... 430/5 |
| 6,456,762 B1 | * | 9/2002 | Nishiki et al. .............. 385/37 |
| 2003/0007729 A1 | * | 1/2003 | Rondinella et al. ........... 385/37 |

FOREIGN PATENT DOCUMENTS

| | | | | |
|---|---|---|---|---|
| JP | 9-304638 | * | 11/1997 | ............ G02B/6/13 |

* cited by examiner

*Primary Examiner*—John D. Lee

(57) ABSTRACT

A method for making an apodized Bragg grating in a photosensitive, planar, linear waveguide. A photosensitive, planar, linear waveguide is provided on a surface of a substrate. A patterned phase mask is placed between the waveguide and a laser beam. The waveguide is exposed through the phase mask to the laser beam wherein either the laser beam is moving at a substantially constant velocity with respect to the substrate and phase mask, or the substrate and phase mask are moving at a substantially constant velocity with respect to the laser beam. The beam has a smoothly varying intensity profile, and the exposure is conducted at an angle of more than 0° and less than 90° to the longitudinal axis of the waveguide under conditions sufficient to induce a modulation in the index of refraction of the waveguide and impart an apodized Bragg grating in the waveguide corresponding to the phase mask pattern.

10 Claims, 1 Drawing Sheet

METHOD FOR APODIZING A PLANAR WAVEGUIDE GRATING

BACKGROUND OF THE INVENTION

1. Field of the Invention

The present invention relates to optical waveguides, and particularly to a method for making optical waveguides having refractive index gratings. More specifically, the invention is directed to a method for making an apodized Bragg grating impressed on a planar optical waveguide.

2. Technical Background

Communication systems now increasingly employ optical waveguides that, because of their high speed, low attenuation and wide bandwidth characteristics, can be used for carrying data, video and voice signals concurrently. Multilayer optical waveguiding structures are used to build integrated optical circuits that route and control optical signals in a optical fiber communication system. It is possible to produce polymeric optical waveguides and other optical devices which transport optical signals via optical circuitry or optical fiber networks. In optical communication systems, messages are transmitted at infrared optical frequencies by carrier waves that are generated using sources such as lasers and light-emitting diodes.

The operation of an optical waveguide is based on the fact that when a core medium which is transparent to light is surrounded or otherwise bounded by a cladding medium having a lower refractive index, light introduced along the core medium's axis is highly reflected at the boundary with the surrounding cladding medium, thus producing a light-guiding effect. Optical waveguides can be make from any material that transmits light. Examples of suitable waveguide materials are polymeric materials and silica doped with germanium. One method used to form an optical waveguide device involves the application of standard photolithographic processes. Photopolymers are of particular interest for optical applications because they can be patterned by photolithographic techniques which are well known in the art. Photopolymers also offer opportunities for simpler, more cost-effective manufacturing processes. Lithographic processes are used to define a pattern in a light-sensitive, photopolymer-containing layer deposited on a substrate. This layer may itself consist of several layers composed of the same or different polymeric materials having dissimilar refractive indices, to form a core, overcladding, undercladding and buffer layers or structures. In practice, most planar waveguide structures have a configuration wherein a buffer layer is applied to a silicon substrate, then an underclad is applied to the buffer, followed by application and patterning of a core layer, and followed finally by application of an overclad. In some instances, the buffer layer can serve as the underclad. If these multiple layers are not optimized, several problems may occur. These include high optical loss due to absorption of light by the substrate; high polarization dependent loss; if heating is performed for tuning or switching, the increase of temperature may alter the index of refraction in such a way as to push light at least partially out of the core where it can interact with the cladding and/or the substrate to produce a variety of unwanted interactions which can, for example, lead to loss; and if the waveguide incorporates a grating, secondary reflections or an unwanted broadening of the wavelength of the reflected signal may be observed.

There is interest in these optical communication systems because they offer several advantages over electronic communications systems using copper wires or coaxial cable. Optical communications systems have a greatly increased number of channels of communication, as well as the ability to transmit messages at much higher speeds than electronic systems. An important extension of these communication systems is the use of wavelength division multiplexing, by which a given wavelength band is segmented into separate wavelengths so that multiple traffic channels can be carried on a single installed line. This requires the use of multiplexers and demultiplexers which are capable of dividing the band into given wavelengths which are separate but closely spaced. Adding individual wavelengths to a wideband signal, and extracting a given wavelength from a multi-wavelength signal require wavelength selective devices, and this has led to the development of a number of add/drop filters. Since wavelength selectivity is inherent in a Bragg grating, those skilled in the art have devised a number of grating assisted devices for adding or extracting a given wavelength with respect to a multi-wavelength signal. Typical optical waveguides propagate waves by the use of the light confining and guiding properties of a central core and a surrounding cladding of a lower index of refraction. Since wave energy is principally propagated in the core, add/drop filters or couplers have been developed using Bragg gratings formed in the core region of a waveguide. However, in order to reduce coupling losses to cladding modes, it is preferable to form Bragg gratings in both the core and in the surrounding cladding regions. Wavelength selectivity is established by the embedded grating which provides forward or backward transmission of the selected wavelength, depending on chosen grating characteristics.

For modern communication systems, however, this approach has a number of functional and operative limitations, pertaining to such factors as spectral selectivity, signal to noise ratio, grating strength, temperature instability and polarization sensitivity. For example, modern applications require that any add/drop filter based upon this concept be very efficient at routing channels, have a strong grating which can be selectively and precisely placed at or adjusted to a specific wavelength and yet have a limited bandwidth, be temperature insensitive, compact, low cost, and not subject to spurious reflections or noise in the chosen wavelength band.

Photosensitive waveguide materials cause the refractive index of that material to be susceptible to increase upon exposure to actinic radiation. Hence, a preferred method of writing a grating refractive index profile involves exposing a waveguide to a laser beam through a phase mask. Optical waveguide refractive index Bragg gratings are periodic or aperiodic variations in the refractive index of a waveguide. Gratings may be formed by physically impressing a modulation on the waveguide or by causing a modulation of the refractive index along the waveguide using photolithographic or other methods known in the art. Gratings written into the core of a waveguide or into the core and surrounding cladding of a waveguide are important components for many applications in optical fiber communication and sensor systems. To automate the fabrication process, it is desirable to write this refractive index profile into a waveguide in a single process step, i.e., with a single pass of the laser beam over the waveguide.

An optical waveguide provided with a Bragg reflection grating of uniform refractive index modulation, uniform pitch and high (>90%) peak reflectance has a spectral width directly proportional to the amplitude of the refractive index modulation. The main peak in the reflection spectrum of a grating with uniform modulation of the index of refraction is accompanied by a series of sidelobes at adjacent wavelengths. The sidelobes are caused by partial reflection of adjacent wavelengths and are undesirable. The side-band level can be reduced by apodization of the grating modulation amplitude in such a way that the strongest refractive index modulation occurs at the center of the grating, with the modulation amplitude decaying smoothly away to a low value at each end of the grating. Apodization reduces the level of the out of band reflectance to achieve suppression of the ghost images or sidelobes.

Apodizing the grating, thereby lowering the intensity of the sidelobes, is desirable in devices where high rejection of nonresonant light is required. In most of these applications, one desires that the apodization process also keep the average index of refraction constant across the grating length, which is sometimes difficult to achieve in a single-step process by controlling only the laser beam. Variation of the index modulation by changing the ultraviolet exposure along the length of the grating causes the magnitude of the refractive index modulation to vary and may cause the average photo-induced refractive index to vary. The average index variation leads to undesirable effects on the resonant wavelength of the grating and widens the grating spectral response. Keeping the average index of refraction constant during the apodization process is especially difficult if the waveguide material is silica doped with germanium. To alleviate these symptoms, after apodizing the grating to generate the non-uniform refractive index modulation, it may be necessary to apply a second compensating exposure to insure that the average photoinduced refractive index is constant along the length of the waveguide. One prior approach to created the desired apodization profile and uniform average refractive index has been by dithering the waveguide to decrease refractive index fringe visibility at specified locations along the waveguide length, but these techniques require complex mechanical fixtures for the phase mask and waveguide that can be vibrated yet precisely positioned.

The present invention provides a simple solution to the apodization problem by exposing the photosensitive waveguide through a phase mask to a laser beam scanned at an angle of more than 0° and less than 90° to the longitudinal axis of the waveguide. Either the laser beam is moved at a constant velocity with respect to the substrate and phase mask, or the substrate and phase mask are moved at a constant velocity with respect to the laser beam. The beam has a smoothly varying intensity profile (for example, a Gaussian profile), and the exposure is conducted under conditions to induce a change in the index of refraction to the waveguide and impart an apodized Bragg grating in the waveguide corresponding to the phase mask pattern.

SUMMARY OF THE INVENTION

The invention provides a process for forming an apodized Bragg grating in a photosensitive, planar, linear waveguide which comprises:

providing a photosensitive, planar, linear waveguide on a surface of a substrate, which waveguide defines a longitudinal axis;

positioning a patterned phase mask between the waveguide and a laser beam;

exposing the waveguide through the phase mask to the laser beam wherein either the laser beam is moving at a substantially constant velocity with respect to the substrate and phase mask, or the substrate and phase mask are moving at a substantially constant velocity with respect to the laser beam, which beam has a smoothly varying intensity profile, and which exposure is conducted at an angle of more than 0° and less than 90° to the longitudinal axis under conditions sufficient to induce a change in the index of refraction to the waveguide and impart an apodized Bragg grating in the waveguide corresponding to the phase mask pattern.

The invention further provides a process for forming a planar, linear waveguide having an apodized Bragg grating which comprises:

applying an undercladding composition to the surface of a substrate;

forming a photosensitive, planar, linear waveguide on the undercladding, which waveguide defines a longitudinal axis;

positioning a patterned phase mask between the waveguide and a laser beam;

exposing the waveguide through the phase mask to the laser beam wherein either the laser beam is moving at a substantially constant velocity with respect to the substrate and phase mask, or the substrate and phase mask are moving at a substantially constant velocity with respect to the laser beam, which beam has a smoothly varying intensity profile, and which exposure is conducted at an angle of more than 0° and less than 90° to the longitudinal axis under conditions sufficient to induce a change in the index of refraction to the waveguide and impart an apodized Bragg grating in the waveguide corresponding to the phase mask pattern; and applying an overcladding composition onto the waveguide either before or after exposure, wherein the overcladding composition and the undercladding composition have an index of refraction less than that of the waveguide. Preferably the overcladding layer is applied before laser exposure so that an apodized Bragg grating is formed in the waveguide and in the underclad and overclad regions surrounding the waveguide.

DETAILED DESCRIPTION OF THE INVENTION

Figure 1:
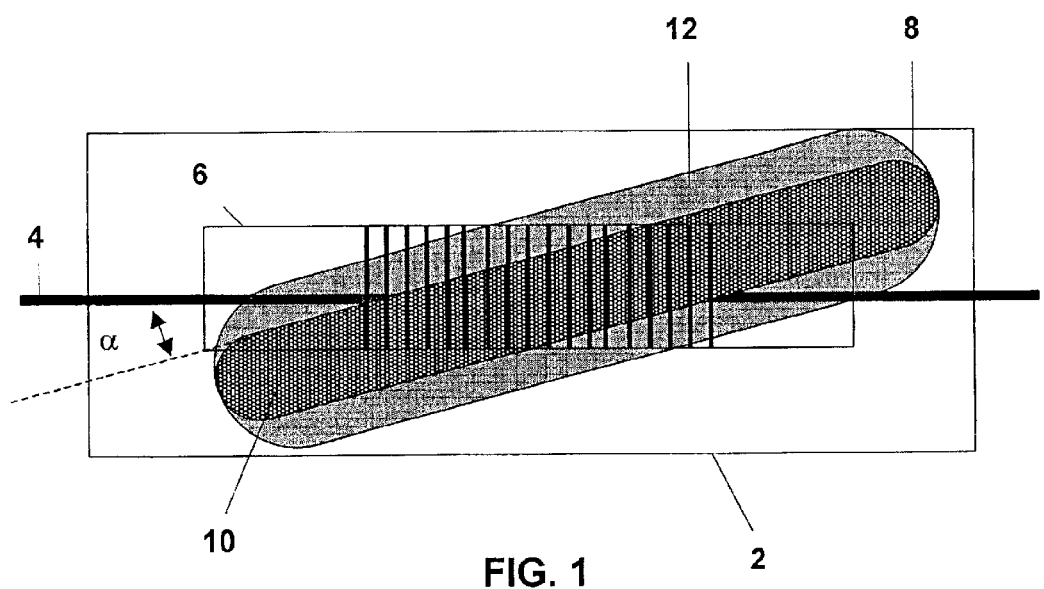
FIG. 1 is a schematic representation of a laser beam light distribution crossing a planar waveguide and phase mask at an angle.

The first step in conducting the process of the invention is to provide a photosensitive, planar, linear waveguide on a surface of a substrate. The waveguide of the invention comprises a substrate; an optional buffer and/or underclad layer on a surface of the substrate; a light-transmissive single-mode waveguide core fabricated directly on the surface of the substrate, underclad or buffer layer; and an overcladding layer on a top surface of the core and on side walls of the core. An important feature of the invention is that the core has an index of refraction which is greater than an index of refraction of the directly adjacent material layers (whether overcladding, undercladding, buffer or substrate). A suitable technique for forming a waveguide is described in U.S. patent application Ser. No. 09/846,697, filed May 1, 2001, which is incorporated herein by reference.

The substrate may be any material on which it is desired to establish a waveguide including materials such as silicon, silicon oxide, gallium arsenide, silicon nitride, glass, quartz, plastics, ceramics, crystalline materials and the like. The substrate may or may not contain other devices, for example, topographical features such as grooves or electrical circuits or electro-optic devices such as laser diodes. Since the substrates of this invention may be absorbing at optical wavelengths of importance to telecommunications, any portion of the propagating light that reaches the substrate is subject to absorption. Absorption of light by the substrate leads to an undesirable polarization-dependent loss of optical power from the propagating signal. The purpose of an intermediate underclad and/or buffer layer is to restrict the penetration of the light into the substrate and to prevent any significant amount of the light from reaching the substrate. One may optionally apply an adhesion promoting tie composition layer onto the surface of the substrate prior to applying subsequent undercladding or buffer layers. One suitable adhesion promoter is (3-methacryloxypropyl) trichlorosilane).

The waveguide core, the optional buffer and/or undercladding layer and the overcladding layer may be any material that transmits light. Examples of suitable materials for planar waveguides are polymeric materials and silica doped with germanium. The preferred materials for this invention are polymeric materials due to the ease of waveguide fabrication using such materials. The polymeric underclad and/or buffer layer may be applied in a number of different ways known in the art, such as spin coating, dip coating, slot coating, roller coating, doctor blading, liquid casting or the like. They may comprise photopolymerizable compounds, such as acrylate compounds. Useful acrylate compounds are described below. Once the layer of photopolymerizable material is deposited onto the surface of the substrate, it is at least partially polymerized by an overall exposure to actinic radiation. Usually the undercladding and buffer layers have a total thickness of from about 3 microns to about 500 microns. Total thicknesses of from about 5 microns to about 100 microns are suitable and especially those from about 8 to about 30 microns. In order to promote adhesion between subsequently applied polymer layers and in some cases to control the gradation of index of refraction at the interface, the initially applied layers, including said buffer layer, can be purposefully left substantially undercured in order to promote the interpenetration of monomers and the formation of covalent bonds between layers.

After the underclad and/or buffer layers are deposited and partially polymerized, a core is formed on the surface of the buffer layer. In one embodiment, the core is formed by depositing a light-transmissive, single-mode photosensitive core layer onto the surface of the underclad or buffer layer. A layer of a core photopolymerizable composition is deposited using well known techniques such as spin coating, dip coating, slot coating, roller coating, doctor blading, liquid casting or the like. The photosensitive core layer is then imagewise exposed to actinic radiation and developed, thereby removing non-image areas of the core layer and not removing imaged areas of the core layer. After the layer is developed, a patterned, light-transmissive core is formed on the under layer and a portion of the under layer is partially revealed. The structure of the core at this stage of fabrication is commonly described as a standing rib. In another embodiment of the invention, the core layer is formed by depositing a light-transmissive, polymeric core layer material onto the surface of the under layer. The core pattern may be produced using well known pattern deposition additive techniques or other subtractive techniques such as reactive-ion-etching. In either embodiment, the core has a cross-sectional width about equal to its cross-sectional height. Usually the core layer has a cross-sectional width and height which each range from about 1 $\mu$m to about 12 $\mu$m, more suitably the core has a cross-sectional width and height which each range from about 4 $\mu$m to about 8 $\mu$m. It is also usual that the width of the core is no more than about twice the height of the core, and the height is no more than about twice the width. Further, usually the core is single-mode in each of its width and height and has about the same height and width. Usual waveguide sizes include cores having a height and width which may be equal to one another and both about 2 $\mu$m, about 3 $\mu$m, about 4 $\mu$m, about 5 $\mu$m, about 6 $\mu$m, about 7 $\mu$m, about 8 $\mu$m, about 9 $\mu$m, or about 10 $\mu$m. In order to minimize coupling losses to standard single-mode glass fiber, for example to SMF-28 sold by Corning Incorporated, a core cross-sectional dimension between 6×6 microns and 8×8 microns may be used. It is preferred that the core has a cross-sectional width and a cross-sectional height, which together with the value of $\Delta n$ are selected such that the waveguide is single-mode for all optical communication wavelengths greater than about 1300 nm, desirably greater than about 1520 nm. Materials for the core layer include polymerizable acrylate materials which are described in detail below.

After the core is formed, an overcladding layer is deposited onto a top surface of the core, onto side walls of the core and onto the revealed portions of the under buffer layers. The photopolymerizable overcladding layer may also be applied via the above mentioned techniques and then overall exposed to actinic radiation. The overcladding layer can be any material capable of keeping applied light confined in the core and in the regions immediately surrounding the core and may comprise polymerizable acrylate compounds which are described in detail below. In one embodiment the overcladding layer usually has a thickness measured from the top of the core of from about 3 to about 30, more usually from about 5 to about 20, and more suitably from about 8 to about 15 microns. The waveguides are formed using photopolymerizable optical materials that include mixtures of monomeric and oligomeric components which are blended to provide a desired index of refraction for each layer. The particular index of refraction for each layer has a significant effect on the performance of the waveguide.

In the usual applications of the invention, the waveguiding structures produced are single-mode. Ensuring that a waveguide will be single-mode entails maintaining a certain relationship between the physical cross-sectional size and shape of the waveguide and the value of $\Delta n$. Generally if the dimension of the waveguide is held fixed, then there is a maximum (cutoff) value of $\Delta n$ that can not be exceeded if the waveguide is to be single-mode. Similarly, if the value of $\Delta n$ is held fixed, then there is a maximum cross-sectional dimension for the waveguide that can not be exceeded, if the waveguide is to be single-mode. Generally, the refractive index of the core is in the range of from about 0.1% to about 10% higher than the refractive index of the surrounding cladding or other directly adjacent materials or more usually the refractive index of the core is about 0.4% to about 3.5% higher than the surrounding cladding or other directly adjacent materials.

The compositions used to form each of the buffer, undercladding, overcladding layer and core each may comprise a photopolymerizable compound and a photoinitiator. The photopolymerizable compound may be a monomer, oligomer or polymer which is an addition polymerizable, nongaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. In order to make planar polymeric optical waveguides, it is necessary to finely control the refractive index of various core and cladding layers. This can be achieved by tailoring the structure of the monomer used in a particular coating layer to achieve the desired refractive index. In practice, it is easier to blend several miscible monomers of different refractive indexes together to get the desired refractive index needed. The monomers are selected such that the formed polymerized element has the desired refractive index as described above. The determination of the refractive index for the particularly selected polymerized compositions are easily determinable by those skilled in the art. Multifunctional acrylate monomers are suitable. The generalized structure of the multifunctional acrylates is given below:

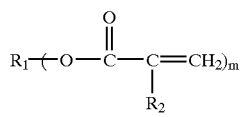

For the core, m may range from 1 to about 6; $R_2$ is H or $CH_3$, and $R_1$ is a linkage of aliphatic, aromatic or aliphatic and aromatic mixed organic molecular segments. Suitably $R_1$ is an alkylene, alkylene oxide, arylene oxide, aliphatic polyether or polyester moiety and $R_2$ is preferably H. To ensure solvent resistance of the film and high contrast photolithography, crosslinked polymers and therefore multifunctional acrylate monomers ($m \geq 2$) are suitable. It is also desirable to reduce stress induced scattering optical loss of the final waveguiding device by using flexible, low glass transition temperature (Tg) polymers. It is known in the art that the glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with $1 \leq m \leq 3$, ideally m=2, and long linkage segments between two ethylenically unsaturated functionalities are useful. For this invention, long linkage segments are those which have an average molecular chain length of at least about 4 carbon atoms or larger and suitably 6 or larger. Suitable flexible linkage structures include alkylenes with chain length larger than about 3 carbon atoms, poly(ethylene oxide), poly(propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize or add undue loss at the light wavelengths of interest, e.g., wavelengths of 1.31 and 1.52–1.63 microns for telecommunications. Suitable substituents nonexclusively include alkyl, aryl, alkoxy and sulfoxide groups, etc. To ensure high resistance to thermal degradation and discoloration, thermally stable molecular structures of $R_1$ are suitable. Such $R_1$ segments should be free of thermally susceptible moieties such as aromatic urethane and amide groups. In order to ensure low birefringence, $R_1$ linkages with low stress optic coefficient and optical polarizability are usual. For the overcladding layer, the acrylate is also as described above, however, the average molecular chain length between ethylenically unsaturated functionalities may be about 6 carbon atoms or longer, usually 8 or longer and more suitably 12 or longer. Suitable flexible linkage structures include alkylenes with chain length larger than 6 carbon atoms, poly(ethylene oxide), poly(propylene oxide) and ethoxylated bisphenol A. In an embodiment of the invention, materials for each layer also include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, di(ethylene glycol)diacrylate, tri(ethylene glycol) diacrylate, tetra(ethylene glycol)diacrylate, poly(ethylene glycol)diacrylates and poly(propylene glycol)diacrylates having an average molecular weight in the range from 200 to 2000, propylene glycol diacrylate, di(propylene glycol) diacrylate, ($C_2$ to $C_{40}$)alkane diol diacrylates such as hexanediol diacrylate, and butanediol diacrylate, tri(propylene glycol)diacrylate, tri(methylolpropane)triacrylates, ethoxylated tri(methylolpropane)triacrylates having an average molecular weight in the range from 500 to 1500, pentaerythritol diacrylate, pentaerythritol triacrylate, pentaerythritol tetraacrylate, di(pentaerythritol)diacrylate, di(pentaerythritol)triacrylate, di(pentaerythritol) tetraacrylate, di(pentaerythritol)pentaacrylate, di(pentaerythritol)hexaacrylate, tri(pentaerythritol) octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Multifunctional acrylate oligomers include, but are not limited to acrylated epoxies, acrylated polyurethanes and acrylated polyesters. Photopolymerizable compounds include aryl acrylates. Illustrative of such aryl acrylate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. The aryl acrylate monomers may be multifunctional aryl acrylates and more usually aryl acrylate monomers are di, tri and tetra acrylates based on the bisphenol-A structure. Usual aryl acrylate monomers are alkoxylated bisphenol A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Desired polymerizable components are monomers having the structure (I):

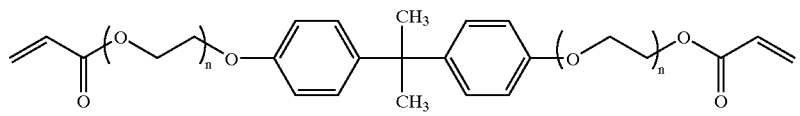

In one embodiment, for the core, n is about 10 or less, usually about 4 or less and more suitably about 2 or less. In one embodiment, for the cladding layers, n is about 2 or more, usually about 4 or more and more suitably about 10 or more. Also useful are acrylate containing copolymers which are well known in the art. In an embodiment, the cladding layer comprises a polymerizable component which has the ethoxylated bisphenol-A disacrylate structure (I) shown above wherein $1 \leq n \leq 20$, usually $4 \leq n \leq 15$, and more suitably $8 \leq n \leq 12$.

The polymerizable compositions may be multifunctional fluorinated (meth)acrylates, particularly those based on the following structures:

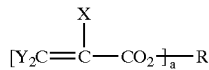

Where Y is H or D; X is H, D, F, Cl, or $CH_3$, and a is an integer from 2 to 4

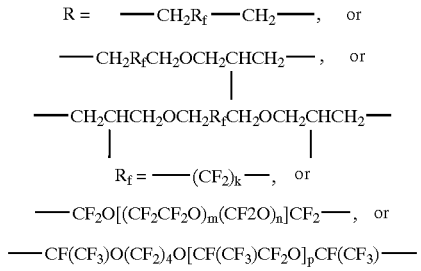

Where k, m, n, and p are integers

Suitable fluorinated meth(acrylates) are described in U.S. patent application Ser. No. 09/337,337, filed Dec. 20, 2000 and published as WO 0078819(A1), which is incorporated herein by reference.

These materials produce waveguides with propagation losses of as little as 0.17 dB/cm at 1550 nanometers. The glass transition temperatures (Tg) of these materials can be easily selected to be below the operating temperature of thermo-optic devices. Low Tg versions of these materials have been shown to have negligible birefringence by grating assisted measurements, and to possess a high value of the temperature derivative of refractive index, which allows the fabrication of power efficient thermo-optic devices such as optical switches and tunable gratings. Useful fluorinated (meth)acrylates include. For example a tetraacrylate F60TA made from the polyol, Fluorolink® T, which is commercially available from Ausimont S.p.A. of Milan ITALY according to the reaction which is shown below:

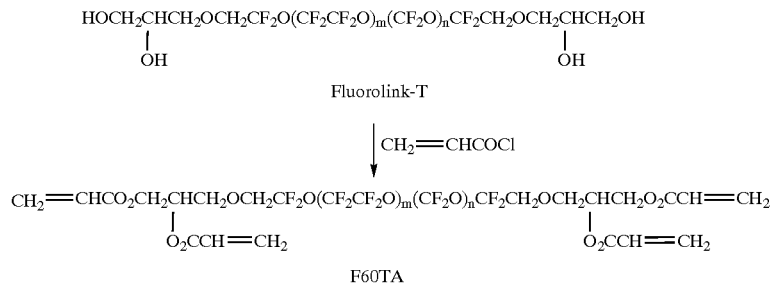

Other multifunctional acrylates include C6DIACRY from Exfluor Research Corporation, Round Rock, Tex.:

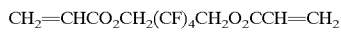

L-12043 from the 3M Company of Saint Paul, Minn.:

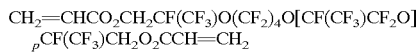

L-9367 similarly from the 3M Company:

$CH_2=CHCO_2CH_2(CF_2CF_2O)_m(CF_2O)_nCF_2CH_2O_2CCH=CH_2$

Although each of the buffer, overcladding and core may be comprised of structurally similar compositions, in order for each of the buffer, and overcladding to have a refractive index which is lower than the refractive index of the core, they must have different chemical compositions for any individual application. For example, the buffer layer composition may have a similar Tg property as the cladding layer, but need not be the identical composition. The photopolymerizable materials and processing conditions are selected such that the Tg of the polymerized buffer ranges from about 60° C. or less, usually about 40° C. or less and more suitably about 25° C. or less.

It is a feature of the present invention that the photopolymerizable compounds to be used in the waveguide core produce a core which after polymerization has a glass transition temperature of about 80° C. or less and suitably about 50° C. or less. It is a feature of the present invention that the photopolymerizable compounds to be used in the waveguide cladding layer produce a cladding layer which after polymerization have a glass transition temperature of about 60° C. or less, usually about 40° C. or less and more suitably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each overall photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light-transmissive element of light-transmissive devices may be used. The amount of photopolymerizable compound is generally used in an amount of from about 35 to about 99.9% by weight of the composition. Usually the photopolymerizable compound is present in the overall composition in an amount of from about 80% to about 99.5% by weight, and more suitably from about 95 to about 99% based on the weight of the overall composition.

Each light-sensitive composition further comprises at least one free radical generating photoinitiator which photolytically generates free radicals. Usually the photoinitiator is a free radical generating addition polymerization initiator activated by actinic light and is thermally inactive near room temperature (e.g. from about 20° C. to about 80° C.) Any photoinitiator which is known to photopolymerize acrylates can be used. Photoinitiators nonexclusively include quinoxaline compounds; vicinal polyketaldonyl compounds, alpha-carbonyls; acyloin ethers; triarylimidazolyl dimers; alpha-hydrocarbon substituted aromatic acyloins; polynuclear quinones; and s-triazines as are known in the art.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Photoinitiators include 1-hydroxycyclohexylphenyl ketone (Irgacure® 184), benzoin, benzoin ethyl ether, benzoin isopropyl ether, benzophenone, benzodimethyl ketal (Irgacure 651), 2,2-diethyloxy acetophenone, 2-hydroxy-2-methyl-1-phenylpropan-1-one (Darocur® 1173), available from E. Merck of Darmstadt, Germany; 1-[4-(2-hydroxyethoxy)phenyl]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)phenyl]phenylmethanone (Quantacure® BMS) from Great Lake Fine Chemicals Limited Of London, England, and di-campherquinone. The most suitable photoinitiators are those which tend not to yellow upon irradiation. Such photoinitiators include benzodimethyl ketal (Irgacure® 651), 2-hydroxy-2-methyl-1-phenylpropan-1-one (Darocur® 1173), 1-hydroxy-cyclohexyl-phenyl ketone (Irgacure® 184), and 1-[4-(2-hydroxyethoxy)phenyl]-2-hydroxy-2-methyl-propan-1-one (Darocur 2959). Fluorolink®-T and C6DIACRYL are sufficiently miscible that conventional photoinitiators can be used for UV curing. For the more highly fluorinated multifunctional acrylates, such as materials L-12043 and L-9367 from 3M, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and more suitably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, titania, glass spheres and the like (especially when in the nanoscale regime, that is, having a particle size less than about 100 nm), dyes, free radical scavengers, contrast enhancers, nitrones and UV absorbers. Antioxidants include such compounds as phenols and particularly hindered phenols including Irganox® 1010 from Ciba-Geigy Corporation Corporation of Tarrytown N.Y.; sulfides; organoboron compounds; organophosphorous compounds; N,N'-hexamethylenebis(3,5-di-tert-butyl-4-hydroxyhydrocinnamamide) available from Ciba-Geigy under the tradename Irganox® 1098. Photostabilizers and more particularly hindered amine light-stabilizers include but are not limited to poly[(6-morpholino-s-triazine-2,4-diyl)[(2,2,6,6,-tetramethyl-4-piperidyl)imino]-hexamethylene [(2,2,6,6,-tetramethyl-4-piperidyl)imino)] available from Cytec Industries of Wilmington, Del. under the tradename "Cyasorb® UV-3346." Volume expanding compounds include such materials as the spiral monomers known as Bailey's monomer. Examples of dyes include methylene green, methylene blue, and the like. Suitable free radical scavengers include oxygen, hindered amine light-stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and usually from about 0.1% to about 1%. All components of the overall composition are in admixture with one another, and most suitably in a substantially uniform admixture.

Once the core photosensitive composition is formed onto the buffer layer in a thin or thick film, actinic radiation is directed onto the film in order to delineate the core layer. That is, the position and dimensions of the core is determined by the pattern of the actinic radiation upon the surface of the core layer. The radiation pattern must be chosen so that the photopolymerizable composition is polymerized in the desired pattern and so that other regions of the film remain unreacted. The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may vary widely, and any conventional wavelengths and sources can be used. In one embodiment, the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Alternatively, the processing can utilize a multiphoton process initiated by a high intensity source of actinic radiation such as a laser. It is also possible to cure the above fluorinated monomers without photoinitiators through the use of electron beam curing. Electron beam or ion beam excitation may be utilized. Exposure time normally varies from a few seconds to about 10 minutes. Temperatures usually range from about 10° C. to about 60° C., however, room temperature is more suitable. Additionally, these materials could be cured thermally through the use of peroxides or other thermal initiators.

Control of the spatial profile of the actinic radiation, that is, where it falls on the layer of photopolymerizable material may be achieved by conventional methods. For example, in one conventional method, a mask bearing the desired core pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the core pattern onto the film. Another conventional method of spatial control is to use a source of actinic radiation which comprises a directed or focused beam such as a laser or electron beam. Such a beam intersects only a small area of the photopolymerizable material film surface. The pattern of the desired core is achieved by moving this small intersection point around on the film surface either by scanning the beam in space or by moving the substrate so that the intersection point is changed relative to a stationary beam. These types of exposure using a beam source are known in the art as direct-write methods. The precise cross-sectional shape of the waveguide core and the width and degree of the graded index region formed at the sides of the core is influenced by the degree of collimation of the light source for both direct-write and mask exposure methods of fabrication. Depending on the desired result the degree of collimation may vary widely. It is generally suitable, to use a relatively highly collimated source for the definition of the waveguide core structure. Collimation to within an angle of less than 10 degrees is useful.

After the photopolymerizable composition of the core layer has been polymerized to form the predetermined pattern of the core layer, the pattern is then developed to remove the nonimage areas and leave behind the predetermined pattern. Any conventional development method can be used, for example, flushing with a solvent for the unirradiated composition. Such solvents include polar solvents, such as alcohols and ketones. Useful solvents are acetone, methanol, propanol, tetrahydrofuran and ethyl acetate, and for highly fluorinated monomers fluoroether solvents such as those sold by Ausimont under the tradename "Galden®" are suitable.

The under layers need not be fully cured, but only partially polymerized. Partially polymerized means that some acrylate groups are present after polymerization, i.e., not all acrylates are converted to saturated hydrocarbons. This means that more than 0% of the number of acrylate groups, usually more than about 10%, and most suitably more than about 25% of the acrylate groups remain unreacted. The upper limit on the number of unreacted groups depends on the gel point of the monomer(s), which in turn depends on the functionality (the number of acrylate groups per monomer). If the functionality equals an integer, f, then the upper limit for unreacted groups is sufficient to cause gelation and is approximately given by the relation $(1-1/f)*100\%$. As an illustration, the number of remaining unreacted groups for a tetra-acrylate monomer be less than 75%, and the number of remaining unreacted groups for a diacrylate monomer be less than 50%. Partial polymerization of the layers prior to application of the next successive layer allows the layers to intermingle at their interface. This intermingling improves adhesion of the layers and can in some cases be used to control the gradation of index of refraction at the interface. In another embodiment of the invention, the waveguide may comprise a doped glass composition such as a germanium doped glass composition.

Next the waveguide core is impressed with a diffraction grating. The waveguide core is exposed to a beam of laser irradiation through a phase mask. Phase masks are well known in the art. The types of lasers are well known in the art and their intensities are easily determinable by those skilled in the art. Examples of suitable lasers include argon-ion lasers operated in UV mode, frequency-doubled argon-ion lasers, and frequency-tripled YAG lasers. FIG. 1 shows a substrate 2 bearing a multilayered waveguide 4. A suitable phase mask 6 is positioned over and along the longitudinal axis of the waveguide 4. The waveguide 4 is then exposed through the phase mask 6 to a beam of laser irradiation 8 scanned at an angle α to the longitudinal axis of the waveguide. Angle α may range from more than 0° and less than 90° to the longitudinal axis under conditions sufficient to induce a change in the index of refraction to the waveguide and impart an apodized Bragg grating on the waveguide corresponding to the phase mask pattern. Usually, angle α ranges from about 1° to about 45° and more usually from about 3° to about 15°. As shown in FIG. 1, the laser beam has a smoothly varying, graded intensity profile (for example, a Gaussian intensity profile) having a more intense central region 10 and a gradually less intense region 12. The step of applying an overcladding composition onto the waveguide may be done either before or after impressing the grating on the core. Usually, the overcladding is applied before the grating is impressed so that the grating is impressed on all layers, i.e. the core, overcladding, undercladding and buffer.

The dose (total radiant energy per unit square of surface) for impressing the grating, as well as a final cure dose to fully cure all of the layers is typically from about 10 to about 500 times the dose employed to partially cure each layer during the preceding fabrication steps. Most suitably the final cure dose is about 100 times this intermediate dose. In this manner, the layers intermix at their interfaces during the early fabrication steps to insure good adhesion between the layers by covalent bonding. Ultimately the desired structure is locked in place with the final curing step, so that no further evolution of the structure may take place.

In addition to making planar waveguides using the lithographic method presented, it may also be possible to make waveguide cores by reactive ion etching), by microreplication, by direct laser writing, or by laser ablation.

Flexibility of the materials allows for fabrication of devices with desired mechanical robustness. Cracking is also avoided even when the device is exposed to very high or very low temperatures. Good adhesion of the materials permits fabrication of robust devices on a variety of substrates without delamination even in some harsh environments such as high temperature and high humidity. Compatibility of device fabrication techniques with semiconductor industry practices allows for development of hybrid optoelectronic circuitry.

Waveguides of the present invention may have any of a number of convenient cross-sectional shapes, such as circular, polygonal, square, rectangular, trapezoidal, and rounded such as following a parabolic or Gaussian curve on the top and sides and flat at the bottom where they contact the buffer. The following non-limiting examples serve to illustrate the invention.

EXAMPLE 1

A silicon wafer is cleaned and then silane treated to provide adhesion to acrylate formulations. The treated wafer is spin coated with a layer of buffer material comprising a 75:25 weight percent perfluoropolyether diacrylate (L-9367)/fluorinated tetraacrylate (F60TA) blend with a photoinitiator. The buffer layer is then partially cured by an overall exposure to actinic radiation. The buffer layer is then spin coated with a layer of core material comprising a 92:8 weight percent fluorinated tetraacrylate (F60TA)/fluoroalkyl acrylate (2,2,3,3,4,4,5,5-octafluorohexane-1,6-diyl diacrylate) having 8 fluorine atoms, blended with a photoinitiator. This material has been chosen such that it has a higher refractive index than the buffer layer. The thickness of the core layer depends on the desired height of the waveguide, which typically ranges from 5 to 9 microns for single mode guides. The core material is then exposed to UV light through a mask. The core exposure dose is adjusted to achieve the desired width of the core and the desired degree of adhesion of the surrounding cladding. The unexposed material is then developed away with solvent. The core is then spin coated with a layer of overcladding material comprising fluorinated tetraacrylate blended with a photoinitiator. The overcladding is then exposed to UV light and partially cured. A phase mask is then positioned over the waveguide. The waveguide is then exposed through the phase mask to a laser beam having approximately a Gaussian intensity distribution. The waveguide and phase mask are held stationary and the beam is swept over the waveguide at a constant velocity through the phase mask at an angle of 10° to the longitudinal axis of the waveguide. All the layers are then cured by a final dose, which penetrates to all layers and completes the cure of the top layer as well as the underlying layers. An apodized grating is thereby impressed on the waveguide.

EXAMPLE 2

A mixture comprising 25 weight percent (wt %) of a fluorinated tetraacrylate F60TA, 75 wt % of a fluorinated diacrylate L-9367 are blended with 2 wt % of a fluorinated photoinitiator to form a homogeneous solution. The solution was then spin coated onto a silicon substrate and cured under a high-pressure mercury-xenon lamp at an irradiance of about 15 mW/cm$^2$ to form a 10 $\mu$m thick buffer. The buffer has a refractive index of 1.313. A core mixture comprising 92 wt % of a fluorinated tetraacrylate F60TA, 7 wt % of a fluorinated diacrylate "C6DIACRY" are blended with 1 wt % of photoinitiator, Darocure® 1173, to form a homogeneous solution. The core solution was then coated onto the buffer layer. The core layer was exposed through a photomask to a mercury-xenon lamp and developed to form a 6-$\mu$m thick core having a refractive index of 1.336.

An overcladding composition comprising 99 wt % of a fluorinated tetraacrylate F60TA and 1 wt % of a photoinitiator, Daracure® 1173, were blended to form a homogeneous solution. The solution was then spin coated over the core and cured under a mercury lamp to form a 12-$\mu$m thick overcladding having a refractive index of 1.329. All refractive indices are given at 1550 nm. A phase mask is then positioned over the waveguide. The waveguide is then exposed through the phase mask to a laser beam having approximately a Gaussian intensity distribution. The waveguide and phase mask are translated along the longitudinal axis of the waveguide while the laser beam is held stationary. The beam passes over the waveguide through the phase mask at an angle of 10° to the longitudinal axis of the waveguide. All the layers are then cured by a final dose, which penetrates to all layers and completes the cure of the top layer as well as the underlying layers. An apodized grating is thereby impressed on the waveguide.

While the present invention has been particularly shown and described with reference to suitable embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for forming an apodized Bragg grating in a photosensitive, planar, linear waveguide which consists essentially of:

providing a photosensitive, planar, linear waveguide on a surface of a substrate, which waveguide defines a longitudinal axis;

positioning a patterned phase mask between the waveguide and a laser beam having a guassian intensity profile;

exposing the waveguide through the phase mask to the laser beam wherein either the laser beam is moving at a substantially constant velocity with respect to the substrate and phase mask, or the substrate and phase mask are moving at a substantially constant velocity with respect to the laser beam, which beam has a smoothly varying intensity profile, and which exposure is conducted at an angle of more than 0° and less than 90° to the longitudinal axis under conditions sufficient to induce a change in the index of refraction to the waveguide and impart an apodized Bragg grating in the waveguide corresponding to the phase mask pattern.

2. The process of claim 1 wherein the angle ranges from about 1° to about 45°.

3. The process of claim 1 wherein the angle ranges from about 3° to about 15°.

4. The process of claim 1 wherein the waveguide comprises a doped glass composition.

5. The process of claim 1 wherein the waveguide comprises a germanium doped glass composition.

6. The process of claim 1 wherein the waveguide comprises a photopolymerizable composition.

7. The process of claim 1 wherein the laser beam is held stationary arid the substrate and phase mask move with respect to the laser beam.

8. The process of claim 1 wherein the substrate and phase mask are held stationary and the laser beam moves with respect to the substrate and phase mask.

9. The process of claim 1 wherein the surface of the substrate comprises an undercladding composition which has an index of refraction less than that of the waveguide.

10. The process of claim 1 wherein the waveguide comprises an overcladding composition on a core, the process further comprising the step of applying the overcladding composition onto the core either before or after exposure, which overcladding composition has an index of refraction less than that of the core.

* * * * *